United States Patent [19]

Suzuki et al.

[11] Patent Number: 5,770,912
[45] Date of Patent: Jun. 23, 1998

[54] ULTRASONIC MOTOR AND ELECTRONIC APPARATUS PROVIDED WITH ULTRASONIC MOTOR

[75] Inventors: Kenji Suzuki; Masao Kasuga; Makoto Suzuki; Akihiro Iino, all of Chiba, Japan

[73] Assignee: Seiko Instruments Inc., Japan

[21] Appl. No.: 611,637

[22] Filed: Mar. 6, 1996

[30] Foreign Application Priority Data

Mar. 7, 1995 [JP] Japan .................................. 7-047669

[51] Int. Cl.⁶ .................................................. H02N 2/00
[52] U.S. Cl. .......................................... 310/316; 310/323
[58] Field of Search ................................. 310/316, 317, 310/323

[56] References Cited

U.S. PATENT DOCUMENTS

| | | | |
|---|---|---|---|
| 4,817,066 | 3/1989 | Takasugi | 361/137 |
| 4,998,048 | 3/1991 | Furutsu | 310/316 |
| 5,087,850 | 2/1992 | Suzuta | 310/316 |
| 5,146,143 | 9/1992 | Furutsu | 310/116 |
| 5,298,829 | 3/1994 | Tsukimoto et al. | 310/323 |
| 5,300,850 | 4/1994 | Okumura et al. | 310/323 |
| 5,336,958 | 8/1994 | Saya et al. | 310/316 |
| 5,402,030 | 3/1995 | Mukohjima | 310/323 |
| 5,453,653 | 9/1995 | Zumeris | 310/323 |
| 5,493,163 | 2/1996 | Nishikawa | 310/316 |
| 5,495,152 | 2/1996 | Fukui | 310/323 |

FOREIGN PATENT DOCUMENTS

| | | | |
|---|---|---|---|
| 562817 | 9/1993 | European Pat. Off. | H01L 41/04 |
| 650252 | 4/1995 | European Pat. Off. | H02N 2/19 |

Primary Examiner—Thomas M. Dougherty
Attorney, Agent, or Firm—Adams & Wilks

[57] ABSTRACT

An ultrasonic motor comprises a piezoelectric element having first and second surfaces, a plurality of electrode patterns disposed on the first surface of the piezoelectric element, first and second circuits for short-circuiting every other one of the electrode patterns to form two electrode pattern groups, a vibrating member disposed on the second surface of and electrically connected to the piezoelectric element, a moving member movably disposed on the vibrating member, a pressure-regulating member for urging the moving member into pressure contact with the vibrating member, and an oscillation drive circuit having at least two power amplifiers and a pre-amplifier. Each of the power amplifiers has an output terminal connected to one of the electrode pattern groups. The pre-amplifier has an input terminal and an output terminal, the input terminal being connected to one of the first and second surfaces of the piezoelectric element, and the output terminal being connected to input terminals of the at least two power amplifiers.

25 Claims, 11 Drawing Sheets

ULTRASONIC MOTOR AND ELECTRONIC APPARATUS PROVIDED WITH ULTRASONIC MOTOR

BACKGROUND OF THE INVENTION

The present invention relates to an ultrasonic motor for frictionally driving a moving member with a vibrational wave produced in the vibrating member to which a piezoelectric element is bonded, and an electronic apparatus provided with the ultrasonic motor.

There has been hitherto known an ultrasonic motor for driving a moving member contacted with a vibrating member under predetermined pressure by using a travelling wave which is produced in the vibrating member by applying a predetermined high-frequency voltage to a piezoelectric element which is bonded to the vibrating member.

For example, such a conventional structure of an ultrasonic motor is disclosed in Japanese Laid-open Patent JP-A-58-148682 (1983).

Figure 15:
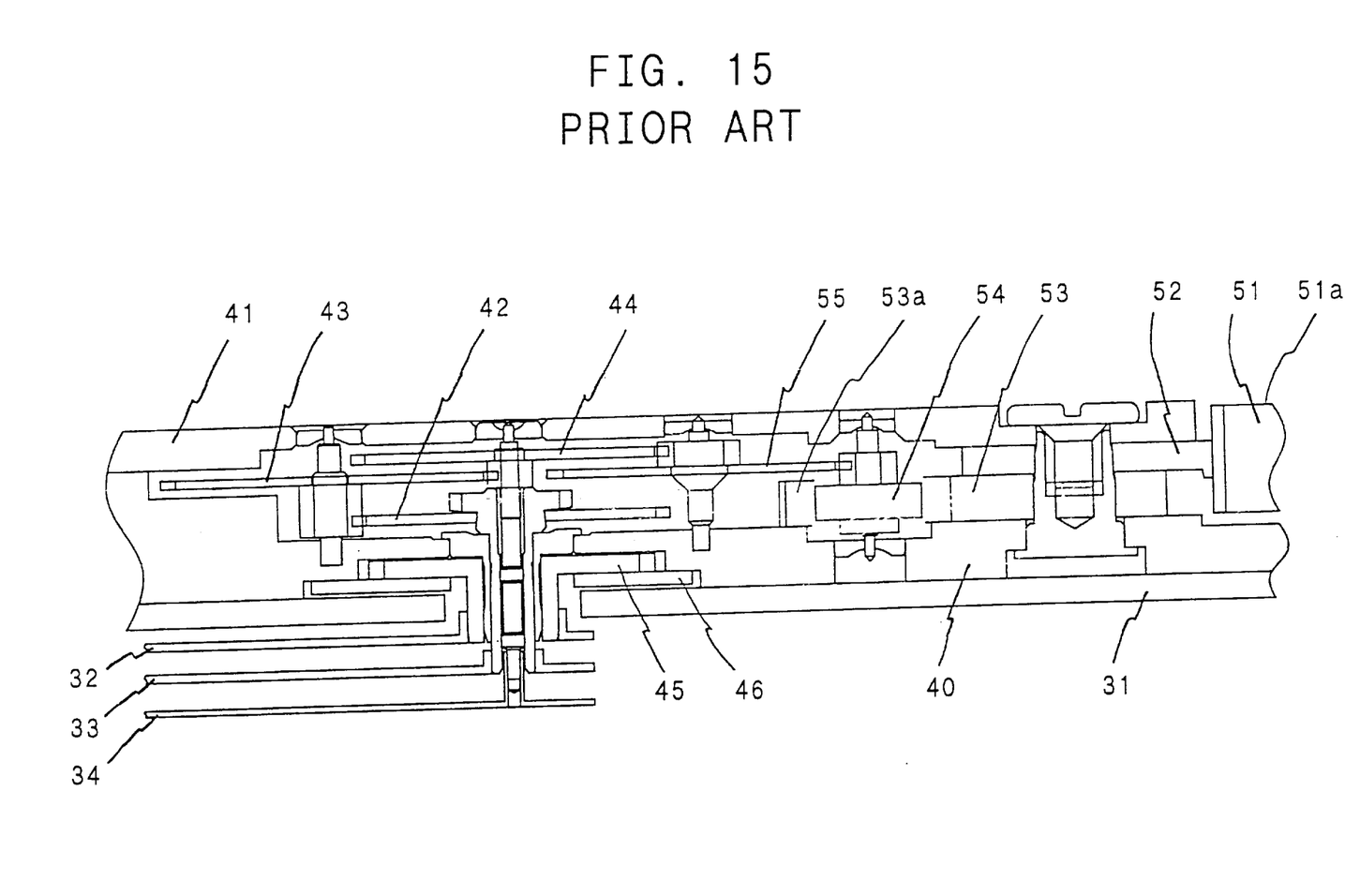
FIG. 15 is a sectional view showing a conventional analog type electronic watch.

Moreover, in a field of an electronic apparatus, especially of an electronic timepiece, having a mechanical actuator, a magnetic motor is generally provided for such an apparatus or timepiece. FIG. 15 is a sectional view of a conventional analog type electronic watch provided with a magnetic stepping motor. A stator 53 is disposed on the upper surface of a base plate 40, and a coil core 52 is screwed to the upper surface of the stator 53 so as to be brought into contact with the upper surface of the stator 53. A coil wire 51a is wound around the coil core 52, and it is connected to a driving circuit (not shown).

A rotor 54 is rotationally installed into a rotor hole 53a of the stator 53, and the rotation of the rotor 54 is transmitted to a fifth wheel 55, a second hand wheel 44, a third wheel 43, a minute hand wheel 42, a minute wheel (not shown), and an hour hand wheel 45.

When a predetermined voltage is applied to the coil wire 51a at a constant interval, the rotor 54 is rotated by a magnetic force of the stator 53, and "hour", "minute" and "second" are indicated with an hour hand 32 fixed to the hour hand wheel 45, a minute hand 33 fixed to the minute hand wheel 42, and a second hand 34 fixed to the second hand wheel 44, respectively.

However, in order to rotationally drive the moving member in a conventional travelling wave type ultrasonic motor, it is required that two high-frequency voltages having different phases be applied to the piezoelectric element to produce vibration of a travelling wave in the vibrating member, and thus two driving circuits are required. Furthermore, since vibrational characteristics of the vibrating member vary in accordance with variation of an environmental temperature or a driving voltage, it is required to provide a complicated driving circuit which can perform a driving operation while conforming driving parameters such as the applied voltage, the phase, etc. to an environmental variation at all times.

In addition, in the travelling wave type ultrasonic motor which performs the driving operation by applying two high-frequency voltages having different phase, the direction of the rotation is switched by varying the phase of the two high-frequency voltages, so that the switching operation of forward/reverse rotation is cumbersome and the driving circuit is also complicated.

As described above, there has been a problem that the driving circuit is very complicated although the ultrasonic motor has a simple structure, and thus there has been also a problem that application to an electronic apparatus, etc. is difficult.

SUMMARY OF THE INVENTION

It is an object of the present invention to provide an ultrasonic motor which can perform a forward/reverse rotation control by using a simple driving system, and has high environmental reliability.

It is another object of the present invention to provide an electronic apparatus provided with an ultrasonic motor which is of a reduced size and which can operate at a low cost by a simplified driving system.

In order to achieve the above objects, an ultrasonic motor according to the present invention includes pressure regulating means which is disposed so that a moving member is brought into contact with a vibrating member under pressure, a piezoelectric element having at least two sets of electrode groups which comprise plural electrodes and are formed on the surface of the piezoelectric element, an oscillation drive circuit having at least two power amplifiers each of which has an output terminal connected to each of the at least two sets of electrode groups formed on the piezoelectric element, and which excitationally drives each of the electrode groups independently, forward/reverse signal generating means for producing a forward/reverse signal to set a rotational direction of the moving member, and a switching circuit for selecting at least one of said at least two power amplifiers of the oscillation drive circuit on the basis of the output signal from the forward/reverse signal generating means. The ultrasonic motor described above is capable of performing a forward/reverse rotation control with a simple driving system and has high environmental reliability.

Figure 1:
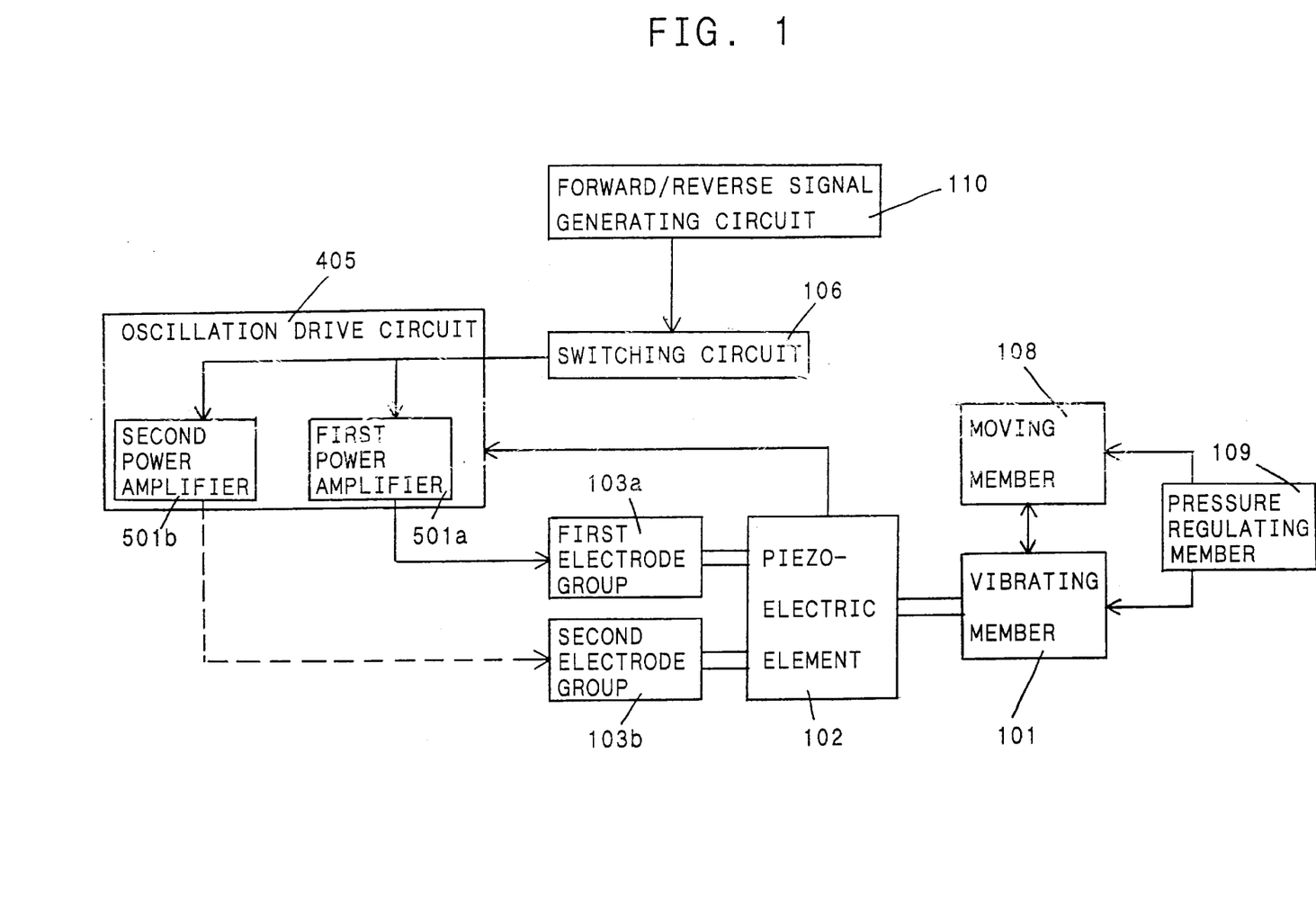
FIG. 1 is a block diagram showing an example of the typical construction of an ultrasonic motor according to the present invention.

FIG. 1 is a block diagram showing an example of the typical construction of an ultrasonic motor according to the present invention.

In FIG. 1, two sets of electrode groups 103a, 103b each comprising plural electrodes are formed on the surface of the piezoelectric element 102. The oscillation drive circuit 405 has two power amplifiers 501a, 501b, and the output terminals of the two power amplifiers 501a, 501b are connected to the two sets of electrode groups 103a, 103b formed on the surface of the piezoelectric element 102 to excitationally drive the respective electrode groups independently of each other. The forward/reverse signal generating circuit 110 outputs to the switching circuit 106 a forward/reverse signal for setting the rotational direction of a moving member 108. The output terminals of the switching circuit 106 are connected to the two power amplifiers 501a, 501b of the oscillation drive circuit 405 to select one of the two power amplifiers 501a, 501b on the basis of the output signal of the forward/reverse signal generating circuit 110. The rotational direction of the moving member 108 is reversed by changing the power amplifier to be operated on the basis of the output signal from the switching circuit 106.

The moving member 108 is disposed so as to be brought into contact with a vibrating member 101 under a predetermined pressure by a pressure regulating member 109.

In the conceptual construction described above, three or more sets of electrode groups and three or more power amplifiers can be applied under the scope of the present invention.

DETAILED DESCRIPTION OF THE PREFERRED EMBODIMENTS

Embodiments according to the present invention will be hereunder described with reference to the drawings.

(1) First Embodiment

Figure 2:
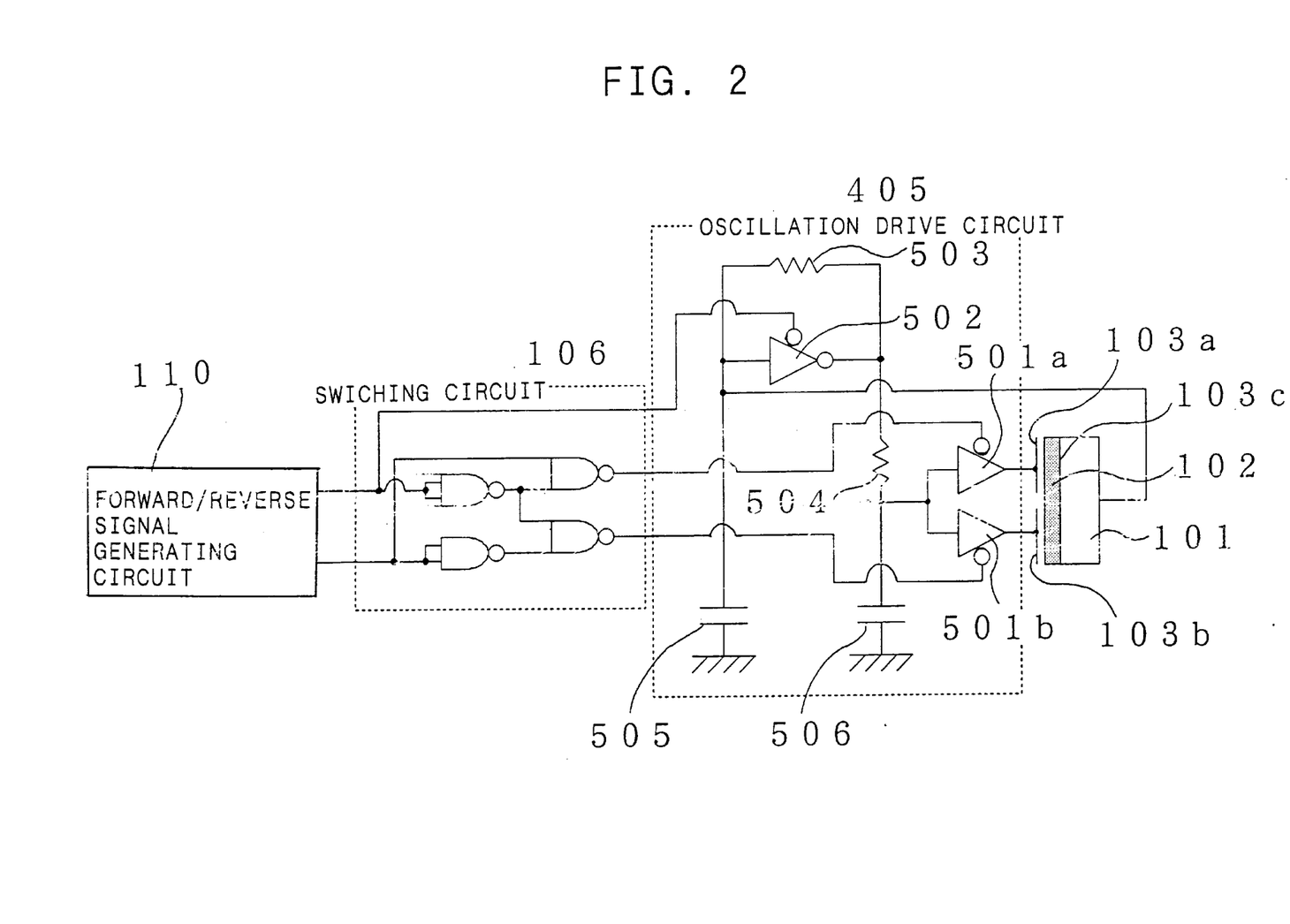
FIG. 2 is an actual circuit diagram showing the first embodiment of the ultrasonic motor according to the present invention.

FIG. 2 shows an actual circuit construction of a first embodiment of an ultrasonic motor according to the present invention.

A piezoelectric element 102 having two sets of electrode groups 103a and 103b each comprising plural electrodes which are formed on one flat surface of the piezoelectric element 102 is bonded to a vibrating member 101 by an adhesive or other means. An oscillation drive circuit 405 is constructed by including the vibrating member 101 to which the piezoelectric element 102 is bonded. A pre-amplifier 502 using a tri-state inverter takes a role of an inverting amplifier for inversely amplifying an electrical signal which is excitation information input from the vibrating member 101 or an electrode 103c formed on the opposite surface to the surface of the piezoelectric element 102 on which the two sets of electrode groups 103a and 103b are formed. Namely, the vibrating member 101 bonded with the piezoelectric element acts as a mechanical resonator for an oscillation circuit in this case. Therefore, the oscillation drive circuit 405 has a feature of a self-exited oscillation circuit on the basis of a resonant characteristic of the vibrating member 101. A resistor 503 is connected to the pre-amplifier 502 in parallel, and serves to stabilize an operating point of the pre-amplifier 502.

The output terminal of the pre-amplifier 502 is connected to the input terminals of two power amplifiers 501a and 501b using tri-state buffers through a resistor 504. The respective output terminals of the two power amplifiers 501a and 501b are connected to the respective two sets of electrode groups 103a and 103b which are formed on the one flat surface of the piezoelectric element 102. Respective one ends of two capacitors 505 and 506 are connected to the input terminal of the pre-amplifier 502 and to the output terminal of the pre-amplifier 502 through the resistor 504, and the other ends thereof are grounded, whereby a phase adjustment in the oscillation drive circuit 405 is performed.

It is very effective to obtain a high motive power output from the ultrasonic motor that the two power amplifiers 501a and 501b are disposed just before the two sets of electrode groups 103a and 103b formed on the piezoelectric element 102 in the following points that the capacitors 505 and 506 are connected to the input terminal and the output terminal of the pre-amplifier 502 for the purpose of phase adjustment and interruption of direct current and that the piezoelectric element 102 basically serves as a capacitive load.

Each of the pre-amplifier 502 and the two power amplifiers 501a and 501b has a control terminal as well as the input and output terminals, and designed in such a tristate structure that the output terminal can be set to a high impedance state in accordance with a signal to be input to the control terminal.

A forward/reverse signal generating circuit 110 outputs to a switching circuit 106 a forward/reverse signal for setting a rotational direction of the ultrasonic motor. The output terminals of the switching circuit 106 are connected to the two power amplifiers 501a and 501b of the oscillation drive circuit 405 and the control terminal of the pre-amplifier 502 respectively, and on the basis of the output signals of the forward/reverse signal generating circuit 110, one of the two power amplifiers 501a and 501b is controlled to serve as a normal buffer while the output terminal of the other power amplifier is kept in a high-impedance state to be disabled.

The vibrating member 101 is driven by the power amplifier which is selected on the basis of the output signals of the switching circuit 106 and functions as the normal buffer. The vibrating member 101 is driven by only the power amplifier which is permitted to function as the normal buffer by the switching circuit 106, and the rotational direction of the ultrasonic motor is reversed when the power amplifier which is permitted to function as the normal buffer is switched by the switching circuit 106.

Figure 3:
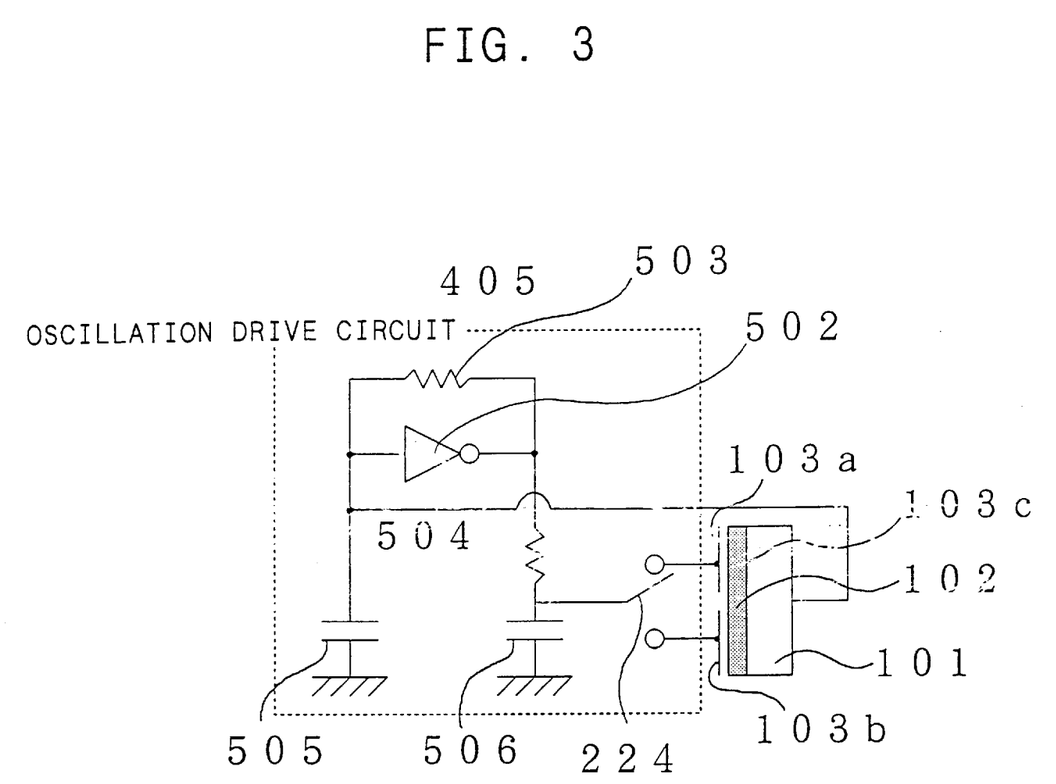
FIG. 3 is a reference diagram to explain features of the ultrasonic motor according to the present invention.

In such an ultrasonic motor that the rotational direction is switched by properly using the two sets of electrode groups 103a and 103b formed on the piezoelectric element 102, it may be considered to use a switch 224 such as an analog switch, as shown in FIG. 3, in order to selectively install and use any one of the two sets of electrode groups 103a and 103b in the oscillation drive circuit 405. However, the switch 224 has no little resistance components, and thus it causes variation of oscillation drive frequency, voltage level, etc. in the vibrating member 101 serving as a capacitive load due to phase shift, so that the loss of the output of the motor is increased.

As compared with the system of switching the electrode groups 103a and 103b by the analog switch 224 as shown in FIG. 3, the structure that the two power amplifiers 501a and 501b are independently provided to the respective two sets of electrode groups 103a and 103b has an advantage that various problems occurring due to the resistance components of the switch can be overcome, and it contributes to the output of the ultrasonic motor.

Further, in the first embodiment, the output terminal of the pre-amplifier 502 can be set to a high-impedance state on the basis of the output signal from the switching circuit 106 which is output on the basis of the output of the forward/reverse signal generating circuit 110, and when the pre-amplifier 502 is disabled, both the two power amplifiers 501a and 501b are disabled and thus the ultrasonic motor can be stopped.

As described above, the switching operation between the forward rotation and the reverse rotation can be easily and accurately performed, so that there can be obtained an advantage that a control system containing a drive circuit can be made simple in construction when this embodiment is applied to a positioning system or the like. Further, when this embodiment is applied to an electronic apparatus to which a lot of restriction in size is imposed, particularly when it is used as a driving source for a wristwatch, the forward/reverse operation can be performed in a simple manner using only one motor, and this is very advantageous in size and cost.

(2) Second Embodiment

Figure 4:
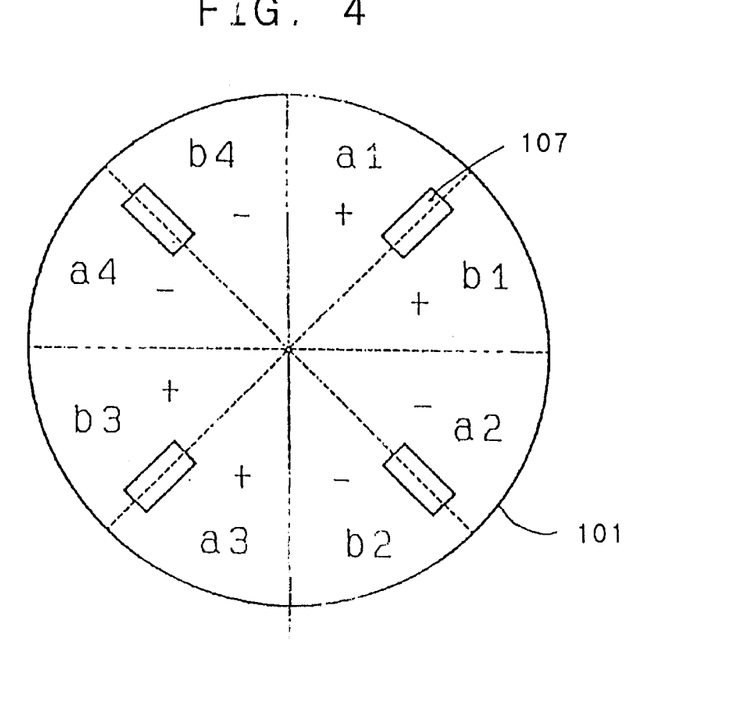
FIG. 4 is a plan view showing a vibrating member of a second embodiment of the ultrasonic motor according to the present invention.
Figure 5:
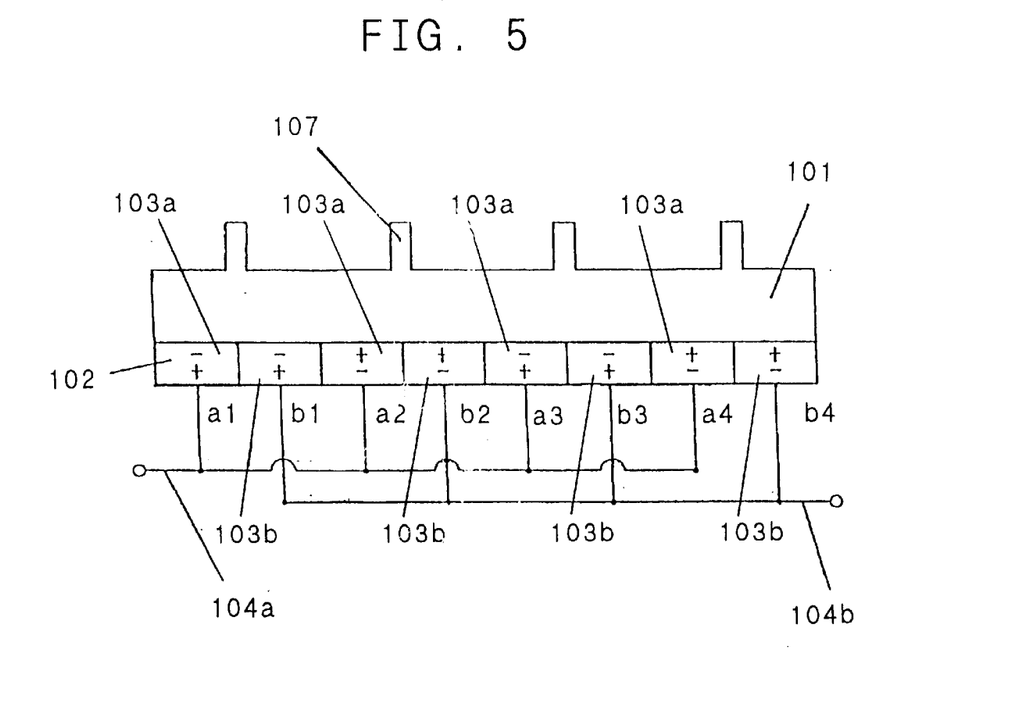
FIG. 5 is a sectional view showing the vibrating member of the second embodiment of the ultrasonic motor according to the present invention.

FIGS. 4 and 5 are plan and sectional views, respectively, of a second embodiment of the ultrasonic motor according to the present invention, and the same construction of the oscillation drive circuit as the first embodiment shown in FIG. 2 is used.

A disc-shaped piezoelectric element 102 is bonded to the flat surface of a disc-shaped vibrating member 101 by an adhesive, thin film forming or other means. The ultrasonic motor of this embodiment excites standing waves of two wave numbers in a circumferential direction in the vibrating member 101 to drive the vibrating member 101.

Eight-segmented electrodes whose number is equal to four times of the number of the waves are alternately subjected to polarization treatments (+) and (−) so that every other electrode forms each of the first electrode group 103a and the second electrode group 103b in the circumferential direction on one flat surface of the piezoelectric element 102 as shown in the figures. The first electrode group 103a comprises electrodes a1, a2, a3 and a4, and the respective electrodes are short-circuited to one another by a first circuit means 104a. The second electrode group 103b comprises electrodes b1, b2, b3 and b4, and the respective electrodes are short-circuited to one another by a second circuit means 104b. In the figures, (+) and (−) represent the direction of the polarization treatment, and a positive electric field and a negative electric field are respectively applied to the bonding surface side of the piezoelectric element 102 which is bonded to the vibrating member 101 to perform the respective polarization treatments.

In place of the above, disc-shaped piezoelectric element on which the electrode is segmented at substantially regular intervals, plural sectorial piezoelectric elements may be attached to the flat surface of the vibrating member in a disc shape.

Projections 107 for transmitting motive power are provided at the positions adjacent to every other boundary portions of the respective electrodes.

In this case, a high-frequency voltage produced by the oscillation drive circuit 405 is applied to any one of the two electrode groups 103a and 103b to drive the vibrating member 101. The rotational direction of the ultrasonic motor is switched in accordance with the selection of the electrode group which drives the vibrating member 101.

Figure 6:
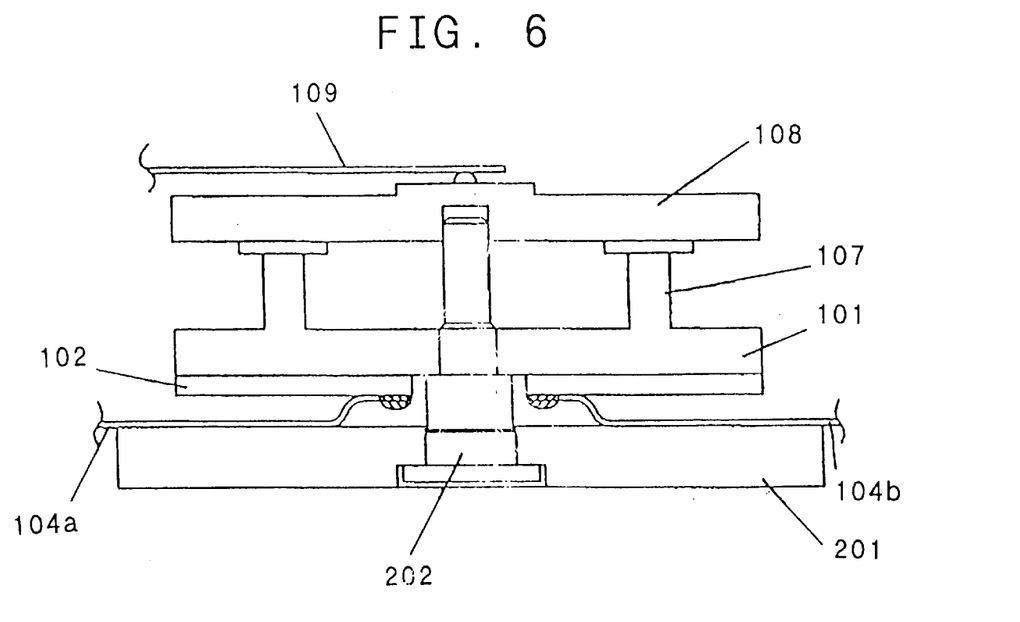
FIG. 6 is a sectional view showing the ultrasonic motor of the second embodiment of the present invention.

FIG. 6 is a sectional view showing the second embodiment of the ultrasonic motor of the present invention.

A center shaft 202 is fixed to a fixed stand 201. The vibrating member 101 on which the piezoelectric element 102 is adhered is fixedly supported in the vicinity of the central portion by the center shaft 202 so as to be integral with the fixed stand 201. The moving member 108 is rotatably guided by the center shaft 202, and it is brought into contact with the vibrating member 101 under a predetermined pressure through the projections 107 by a pressure regulating spring 109 whose one end is fixedly mounted to the exterior of the ultrasonic motor(not shown).

(3) Third Embodiment

Figure 7:
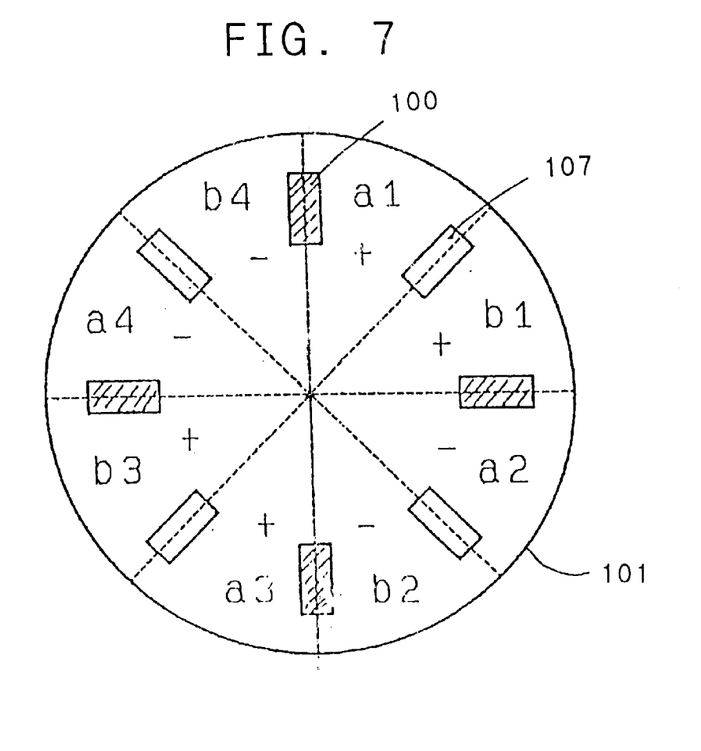
FIG. 7 is a plan view showing a vibrating member of a third embodiment of the ultrasonic motor according to the present invention.
Figure 8:
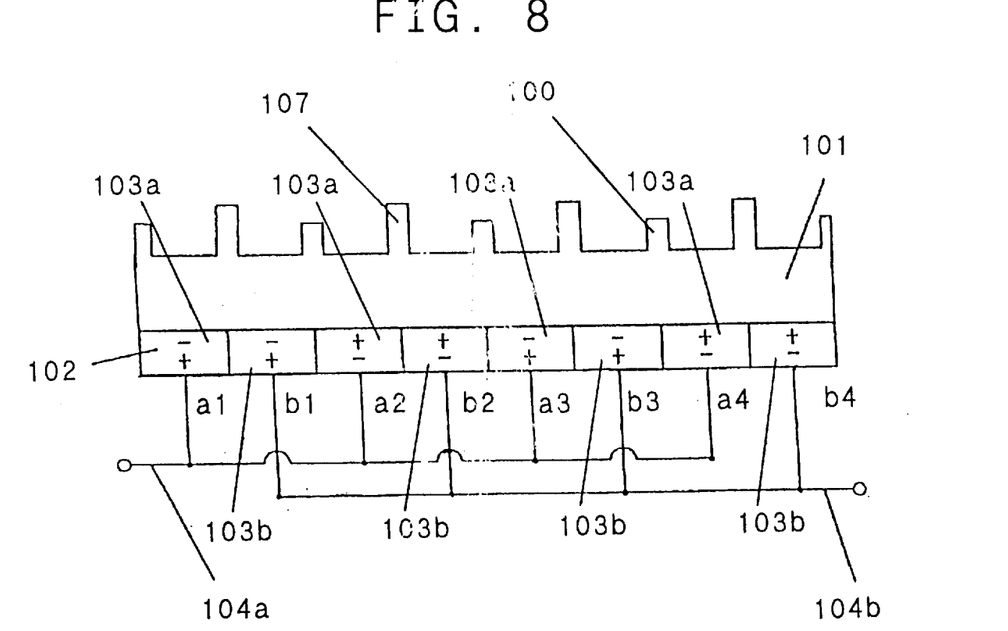
FIG. 8 is a sectional view showing the vibrating member of the third embodiment of the ultrasonic motor according to the present invention.

FIGS. 7 and 8 are plan and sectional views, respectively, showing a third embodiment of the ultrasonic motor according to the present invention, and only the different point from the vibrating member used in the second embodiment will be described.

The same construction of the two sets of electrode groups 103a and 103b formed on one surface of the piezoelectric element 102 as the second embodiment may be applied.

Projections 107 which serve to transmit the motive power and has the same shape as the second embodiment are provided at the positions adjacent to the every other boundary portions of the respective electrodes, and further shorter projections 100 which has the same shape as the projections 107 are provided at the positions adjacent to the boundary portions of the respective electrodes other than the positions at which the projections 107 are provided.

The projections 107 are provided to transmit the motive power to the moving member 108. However, the shorter projections 100 having the same shape as the projections 107 do not transmit the motive power to the moving member 108, and are arranged on the surface of the vibrating member 101 so that the plural projections formed on the surface of the vibrating member 101 are in an excellently balanced arrangement. Therefore, the shorter projections 100 contribute to adjust a vibration state.

Further, in this embodiment, the shorter projections 100 which do not transmit the motive power and are provided to adjust the vibration state of the vibrating member 101 are disposed at the positions adjacent to the boundary portions between the respective projections 107. However, shorter projections whose number is equal to an odd number such as three, five or the like may be provided between the respective projections 107, or an arcuate projection having a large width may be provided in the circumferential direction between the projections 107.

(4) Fourth Embodiment

Figure 9:
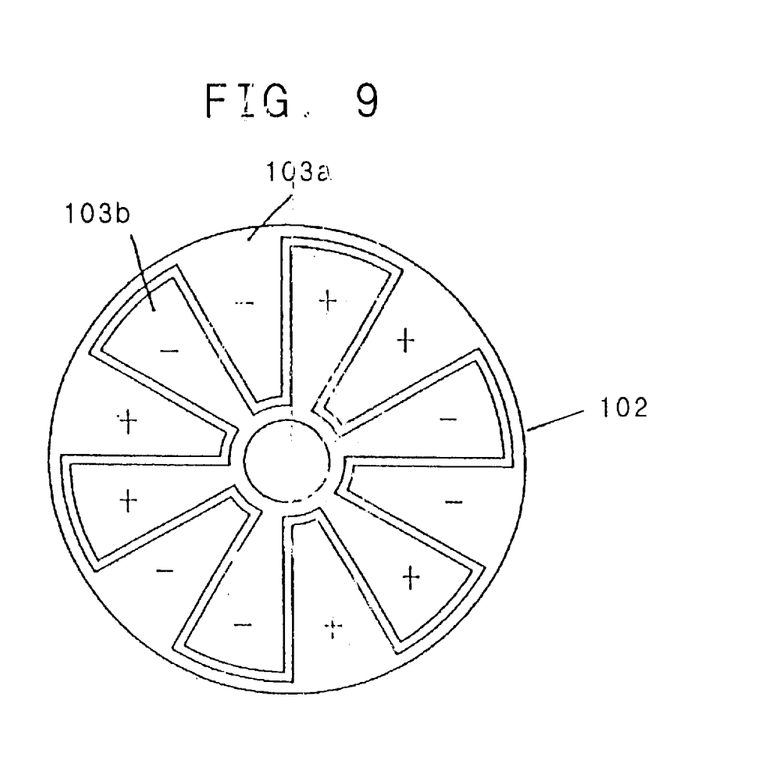
FIG. 9 is a diagram showing an electrode construction on the surface of a piezoelectric element of a fourth embodiment of the ultrasonic motor according to the present invention.
Figure 10:
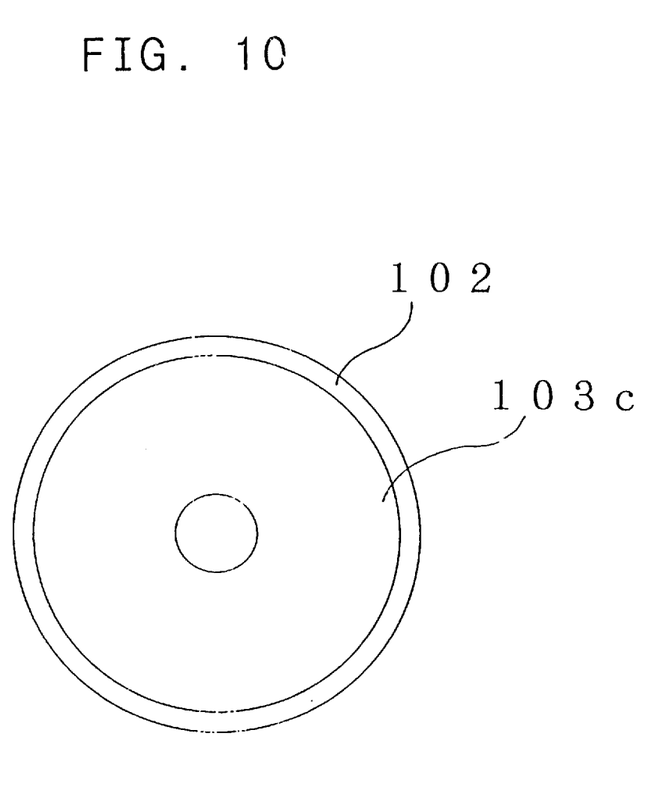
FIG. 10 is a diagram showing an electrode construction on the back surface of the piezoelectric element of the fourth embodiment of the ultrasonic motor according to the present invention.

FIGS. 9 and 10 show the electrode construction which is formed on the front and back surfaces, respectively, of the piezoelectric element bonded to the vibrating member of a fourth embodiment of the ultrasonic motor according to the present invention.

In the ultrasonic motor of this embodiment, in order to excite standing waves of three wave numbers in the circumferential direction and drive the vibrating member 101, 12-segmented electrodes whose number is equal to four times of the number of the waves are formed in the circumferential direction on one flat surface of the piezoelectric element 102, and projections 107 for transmitting the motive power to the moving member 108 are provided at the positions of the every other electrode boundary lines of the piezoelectric elements 102 on the surface which is opposite to the surface of the vibrating member 101 to which the piezoelectric element 102 is bonded. That is, the number of the projections is equal to six.

Connection is required to be made to every other electrode to construct the two sets of electrode groups 103a and 103b by using the 12-segmented electrodes. However, in order to satisfy this requirement, all the 12-segmented electrodes must be soldered or welded, and a lead wiring connection may cause leakage of the vibration or increase of loss, so that some troubles may occur in a manufacturing process.

Therefore, the first electrode group 103a and the second electrode group 103b are formed as follows: the 12-segmented electrodes are formed on one surface of the piezoelectric element 102 while an electrode 103c is formed on the other whole surface by a thin film forming means such as vapor deposition, sputtering, printing or the like, then performing a polarization treatment shown in FIG. 9, and then performing the connection on every other electrodes of the 12-segmented electrodes in the same thin film forming means as described above again. By forming the two sets of electrode groups 103a and 103b as described above, the number of lead wires which are required to apply a driving signal can be reduced to only two unrelated to wave numbers produced in a circumferential direction on the piezoelectric element 102.

Further, the piezoelectric element on which the two electrode groups are formed by the thin film forming means as described above may be applied to the ultrasonic motor of the previously-described embodiment.

(5) Fifth Embodiment

Figure 11:
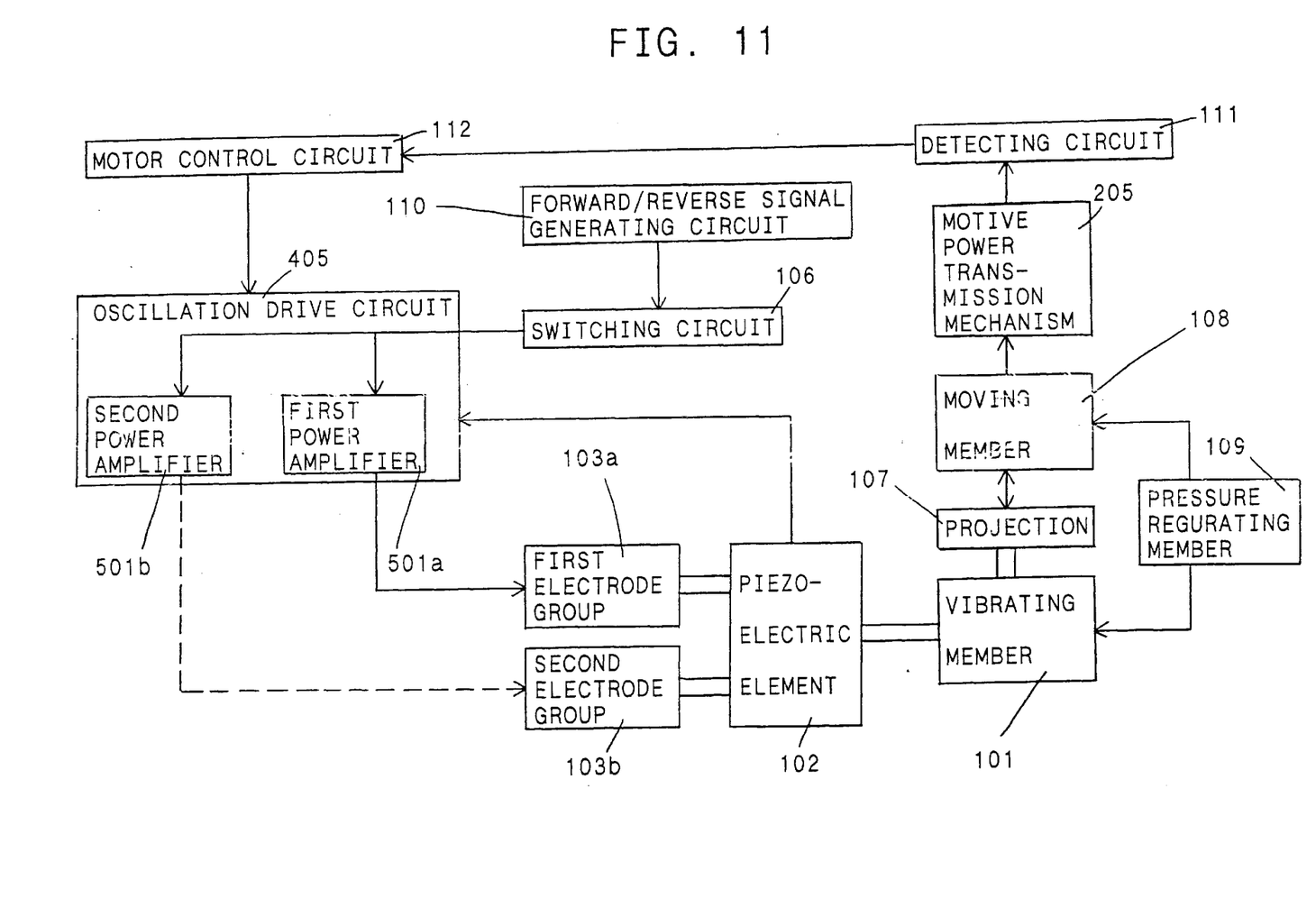
FIG. 11 is a block diagram showing a fifth embodiment of the ultrasonic motor according to the present invention.

FIG. 11 is a block diagram showing a fifth embodiment of the ultrasonic motor of the present invention.

The same support structure as the second embodiment shown in FIG. 6 is used for the vibrating member 101, the piezoelectric element 102 and the vibrating member 101.

The oscillation drive circuit 405 performs power amplification and phase adjustment on excitation information of the vibrating member which is obtained from the piezoelectric element 102 bonded to the vibrating member 101, and applies a high-frequency voltage to any one of the first electrode group 103a which is short-circuited by the first circuit means 104a shown in FIG. 5 or the second electrode group 103b which is short-circuited by the second circuit means 104b shown in FIG. 5. Further, there is provided a switching circuit 106 for switching the electrode group to which the high-frequency voltage produced by the oscillation drive circuit 405 is applied, on the basis of the output of the forward/reverse signal generating circuit 110 to produce a forward/reverse signal to set the rotational direction of the ultrasonic motor.

Bending vibrational wave is excited in the vibrating member 101 and the piezoelectric element 102 with the high-frequency voltage produced by the oscillation drive circuit 405, whereby the moving member 108 which is disposed so as to b e brought into contact with the vibrating member 101 under pressure by a pressure regulating member 109 such as a coil spring, a leaf spring or the like is rotationally driven through the projections 107 provided on the vibrating member 101.

A detecting circuit 111 detects rotation information of the moving member 108 through a motive power transmission mechanism 205 such as a gear, a friction wheel or the like, and on the basis of the detection signal of the detecting circuit 111, a motor control circuit 112 adjusts the oscillation drive circuit 405 to determine the driving state of the ultrasonic motor.

In this embodiment, the rotation information of the moving member 108 is detected through the motive power transmission mechanism 205, however, it may be directly detected from the moving member 108.

(6) Sixth Embodiment

Figure 12:
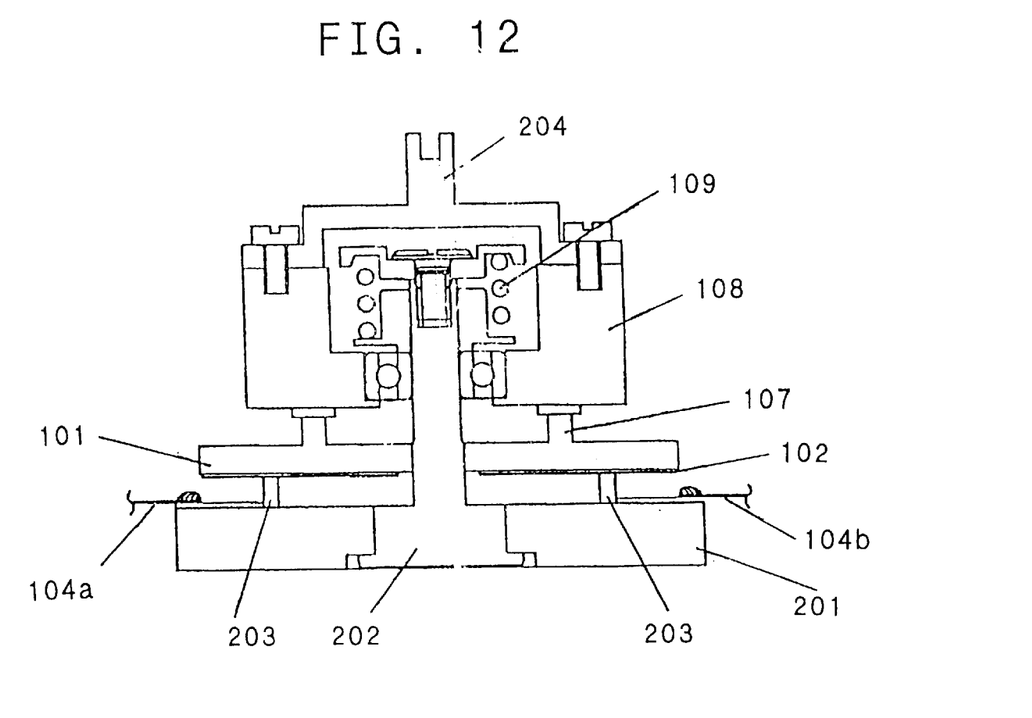
FIG. 12 is a sectional view showing a sixth embodiment of the ultrasonic motor according to the present invention.

FIG. 12 is a sectional view of a sixth embodiment of the ultrasonic motor of the present invention.

A center shaft 202 is fixed to a fixed stand 201. The piezoelectric element 102 is adhered to the vibrating member 101, and it is fixedly supported in the vicinity of the center portion by the center shaft 202 so as to be integral with the fixed stand 201. The moving member 108 has an output shaft 204 and a motive power transmission mechanism such as a gear or a friction wheel (not shown) to transmit torque from the output shaft.

The moving member 108 is brought into contact with the vibrating member 101 under a predetermined pressure by the pressure regulating member 109 so as to be rotatable. Further, in this embodiment, a means of performing electrical conduction to the first electrode group 103a and the second electrode group 103b is achieved by an elastic support member 203 which performs both conduction and support functions and is provided in the neighborhood of node portions other than the central portion of the vibrating member 101 and the piezoelectric element 102. With this construction, the respective segmented electrodes can be conducted to one another by using no conduction short-circuiting pattern.

(7) Seventh Embodiment

Figure 13:
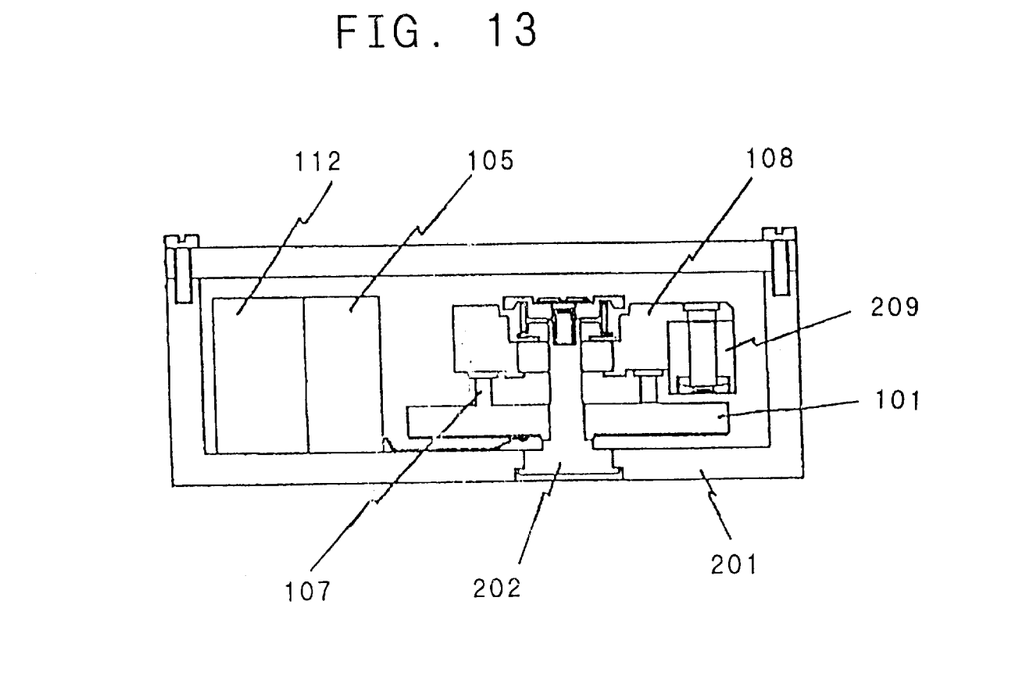
FIG. 13 is a sectional view showing a seventh embodiment of a vibration generating apparatus using the ultrasonic motor according to the present invention.

FIG. 13 is a sectional view showing a seventh embodiment of a vibration generating device using the ultrasonic motor according to the present invention.

The different point from the sixth embodiment of the present invention shown in FIG. 12 resides in that an eccentric weight 209 is provided instead of the output shaft. The moving member 108 rotates integrally with the eccentric weight 209. In accordance with wireless information from the external, time information or the like, the moving member 108 and the eccentric weight 209 of the ultrasonic motor are rotated on the basis of a predetermined signal, whereby information is transmitted to a user with vibration.

(8) Eighth Embodiment

Figure 14:
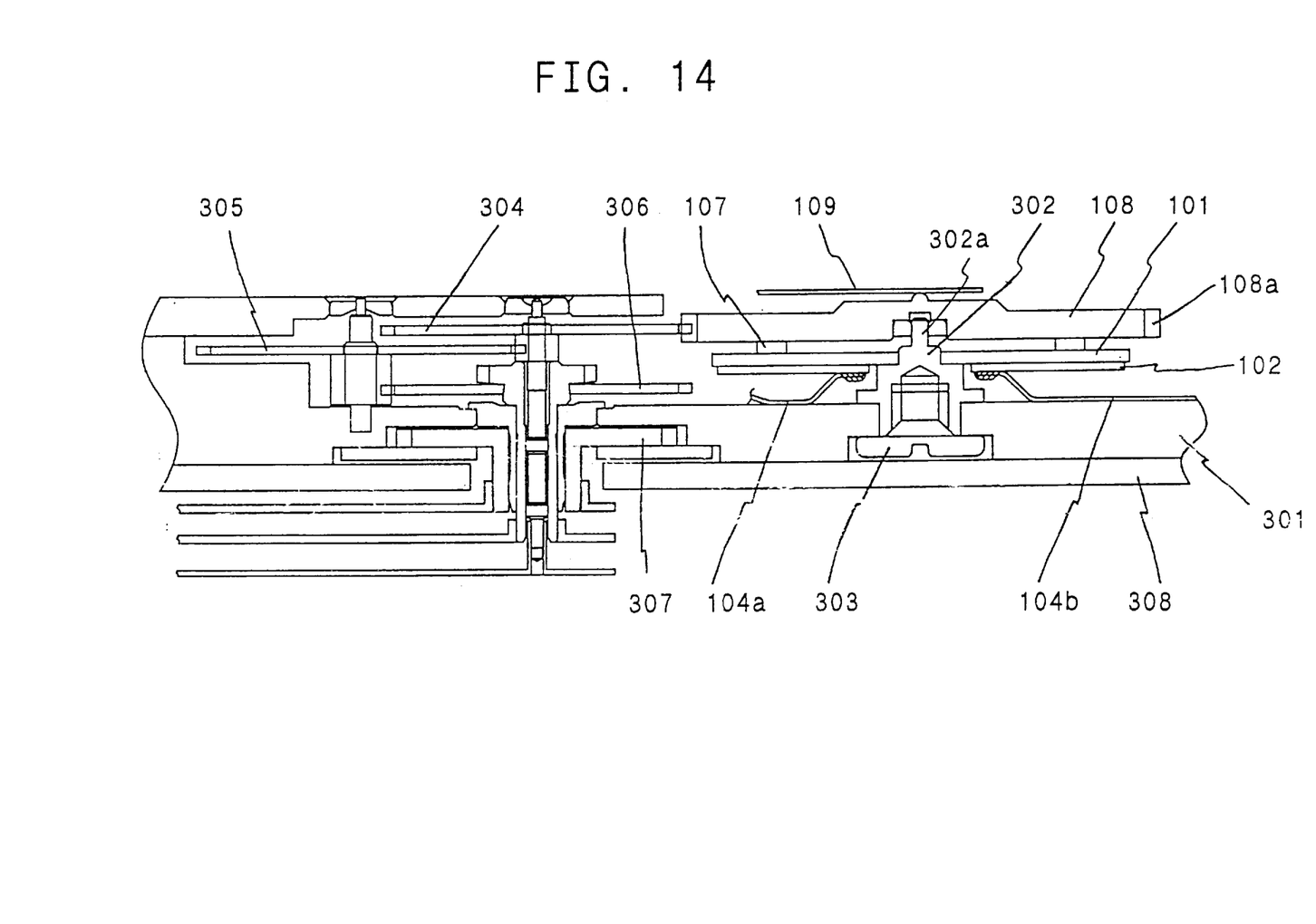
FIG. 14 is a sectional view showing an eighth embodiment of an analog type electronic watch equipped with the ultrasonic motor according to the present invention.

FIG. 14 is a sectional view of an eighth embodiment of an analog type electronic watch using the ultrasonic motor of the present invention.

The vibrating member 101 of the above-described embodiments is fixed to a guide pin 302, and the guide pin 302 is fixed to a base plate 301 by a set screw 303. The moving member 108 is brought into contact with the vibrating member 101 through the projections 107 under a predetermined pressure by the pressure regulating member 109, and guided to the tip portion 302a of the guide pin 302 so as to be rotatably mounted.

Through the first circuit means 104a or the second circuit means 104b provided to the electrodes of the piezoelectric element 102, a high-frequency voltage is applied to the piezoelectric element 102 from the oscillation drive circuit (not shown) of the ultrasonic motor which operates in response to a signal output from a time counting circuit (not shown) operating in accordance with a time base signal output from an oscillation source (not shown), whereby the vibrating member 101 is vibrated and thus the moving member 108 is rotated at a constant speed through the projections 107.

A moving member gear 108a on the peripheral portion of the moving member 108 drives a second hand wheel 304, and further drives a third wheel 305, a minute hand wheel 306, a minute hand (not shown) and an hour hand wheel 307 at constant speeds.

If the number of gear teeth of each gear is set to a predetermined value, "hour", "minute" and "second" are indicated by an hour hand fixed to the hour hand wheel 307, a minute hand fixed to the minute hand wheel (306) and a second hand fixed to the second hand wheel (304).

Display of time information is performed not only by plural wheels and hands, but also by directly affixing pointers or indexes to the moving member 108. These elements can be viewed from a side of a dial 308 or from a side of the pressure regulating member 109 in FIG. 14.

Further, by adjusting the drive signal output from the motor drive circuit to the piezoelectric element 102 through the motor control circuit, the second hand can move intermittently every second or move continuously.

In addition to the time display, calendar display containing information on year, month and day, and display of residual quantity of battery, environmental information, works, etc. can be performed.

According to the ultrasonic motor of this invention as described above, at least two sets of electrode groups each comprising plural electrodes are formed on the surface of the piezoelectric element, and each of the output terminals of at least two power amplifiers of the oscillation drive circuit is connected to each of at least two sets of electrode groups which are formed on the piezoelectric element. The ultrasonic motor comprises forward/reverse signal generating circuit for generating a forward/reverse signal to set the rotational direction of the ultrasonic motor, and a switching circuit for selecting any one of the at least two power amplifiers of the oscillation drive circuit on the basis of the output signal from the forward/reverse signal generating circuit. Therefore, there can be obtained an advantage that the drive system can be made simple and the environmental reliability can be improved.

That is, the forward/reverse switching operation can be easily and accurately performed, so that the control system containing the drive circuit is simple when this invention is applied to a positioning system or the like. Further, when this invention is used as an electronic apparatus having a lot of restriction in size, particularly a driving source for a wristwatch, the forward/reverse operation can be simply performed by only one motor, and this is very convenient in size and cost.

What is claimed is:

1. An ultrasonic motor comprising:

a moving member;

a vibrating member for frictionally driving said moving member with a vibrational wave produced in said vibrating member;

pressure regulating means disposed so that said moving member is brought into contact with said vibrating member for regulating a frictional force between said moving member and said vibrating member under pressure;

a piezoelectric element bonded to said vibrating member for producing the vibrational wave through a stretching and contracting motion of the piezoelectric element, the piezoelectric element having at least two sets of electrode groups which comprise plural electrodes and are formed on a surface of said piezoelectric element;

an oscillation drive circuit having at least two power amplifiers each of which has an output terminal connected to one of said at least two sets of electrode groups formed on said piezoelectric element and which excitationally drives one of said electrode groups independently of the other, and a pre-amplifier having an input terminal and an output terminal, the input terminal being connected to said vibrating member and/or an electrode formed on a surface opposite to a surface on which said at least two sets of electrode groups are formed, the output terminal being connected to input terminals of said at least two power amplifiers, and wherein one of said pre-amplifier and said at least two power amplifiers comprises an inverting amplifier;

forward/reverse signal generating means for producing a forward/reverse signal to set a rotational direction of said moving member; and a switching circuit for selecting at least one of said at least two power amplifiers of said oscillation drive circuit on the basis of the forward/reverse signal outputted from said forward/reverse signal generating means.

2. An ultrasonic motor as claimed in claim 1; wherein said oscillation drive circuit has a resonance circuit formed of said vibrating member and a capacitor by utilizing an inductive property of said vibrating member in a mechanical resonance state.

3. An ultrasonic motor as claimed in claim 1; wherein the electrodes are disposed on at least one surface of the piezoelectric element at nearly equal intervals in a multiple of four, respective two neighboring electrodes of said electrodes being paired and subjected to a polarization treatment so that a polarization direction of said electrodes is alternately reversed every pair; and wherein the ultrasonic motor further comprises first circuit means and second circuit means for electrically short-circuiting every other electrode to construct said two sets of electrode groups, and projections for transmitting motive power to said moving member, the projections being disposed at positions adjacent to every other boundary portions of said electrodes whose number is equal to a multiple of four and which are disposed at substantially regular intervals on at least one surface of said piezoelectric element bonded to one surface of said vibrating member.

4. An ultrasonic motor as claimed in claim 1; wherein the electrodes are disposed on at least one surface of the piezoelectric element at nearly equal intervals in a multiple of four, respective two neighboring electrodes of said electrodes being paired and subjected to a polarization treatment so that a polarization direction of said electrodes is alternately reversed every pair; and wherein the ultrasonic motor further comprises first circuit means and second circuit means for electrically short-circuiting every other electrode to construct said two sets of electrode groups, first projections for transmitting motive power to said moving member, the projections being disposed at positions adjacent to every other boundary portions of said electrodes whose number is equal to a multiple of four and which are disposed at substantially regular intervals on at least one surface of said piezoelectric element on one surface of said vibrating member, and second projections shorter than the first projections, each of the second projections being disposed between said first projections, respectively, to adjust a vibrational state of the vibrating member and designed to be lower in height than said first projections so as not to transmit motive power to said moving member.

5. An ultrasonic motor as claimed in claim 1; further comprising detecting means for detecting a rotational state of said moving member, and a motor control circuit for adjusting said oscillation drive circuit on the basis of an output signal of said detecting means to control said ultrasonic motor.

6. An ultrasonic motor as claimed in claim 1; further comprising an output shaft which is secured to said moving member for transmitting motive power generated by said ultrasonic motor.

7. An ultrasonic motor comprising:

a moving member;

a vibrating member for frictionally driving said moving member with a vibrational wave produced in said vibrating member;

pressure regulating means disposed so that said moving member is brought into contact with said vibrating member for regulating a frictional force between said moving member and said vibrating member under pressure;

a piezoelectric element bonded to said vibrating member for producing the vibrational wave through a stretching and contracting motion of the piezoelectric element, the piezoelectric element having at least two sets of electrode groups which comprise plural electrodes and are formed on a surface of said piezoelectric element;

an oscillation drive circuit having at least two power amplifiers each of which has an output terminal connected to one of said at least two sets of electrode groups formed on said piezoelectric element and which excitationally drives one of said electrode groups independently of the other, and a pre-amplifier having an input terminal and an output terminal, the input terminal being connected to said vibrating member and/or an electrode formed on a surface opposite to a surface on which said at least two sets of electrode groups are formed, the output terminal being connected to input terminals of said at least two power amplifiers, and wherein one of said pre-amplifier and said at least two power amplifiers comprises an inverting amplifier;

forward/reverse signal generating means for producing a forward/reverse signal to set a rotational direction of said moving member;

a switching circuit for selecting at least one of said at least two power amplifiers of said oscillation drive circuit on the basis of the forward/reverse signal outputted from said forward/reverse signal generating means; and display means mechanically coupled to said moving member for displaying predetermined information on the basis of an operation of the ultrasonic motor.

8. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element;

first and second circuit means for short-circuiting every other one of the electrode patterns to form two electrode pattern groups;

a vibrating member disposed on the second surface of and electrically connected to the piezoelectric element;

a moving member movably disposed on the vibrating member;

a pressure-regulating member for urging the moving member into pressure contact with the vibrating member; and an oscillation drive circuit having at least two power amplifiers each of which has an output terminal connected to one of the electrode pattern groups, and a pre-amplifier having an input terminal and an output terminal, the input terminal of the pre-amplifier being connected to one of the first and second surfaces of the piezoelectric element, and the output terminal of the pre-amplifier being connected to input terminals of the at least two power amplifiers.

9. An ultrasonic motor as claimed in claim 8; wherein each of the at least two power amplifiers of the oscillation drive circuit drives one of the electrode pattern groups independently from each other one.

10. An ultrasonic motor as claimed in claim 8; wherein one of the pre-amplifier and the at least two power amplifiers comprises an inverting amplifier.

11. An ultrasonic motor as claimed in claim 8; further comprising forward/reverse signal generating means for producing a forward/reverse signal to set a rotational direction of the moving member, and a switching circuit for selecting at least one of the at least two power amplifiers of the oscillation drive circuit on the basis of the forward/reverse signal outputted from the forward/reverse signal generating means.

12. An ultrasonic motor as claimed in claim 8; wherein the oscillation drive circuit further comprises a resonance circuit comprised of the vibrating member and a capacitor.

13. An ultrasonic motor as claimed in claim 8; wherein the plurality of electrodes are disposed on the first surface of the piezoelectric element at nearly equal intervals in a multiple of four; and wherein each pair of two neighboring electrode patterns have an alternately reversed direction of polarization.

14. An ultrasonic motor as claimed in claim 13; further comprising first projections for transmitting vibrational movement of the vibrating member to the moving member, the first projections being disposed on a surface of the vibrating member near every other one of the boundaries of the electrode patterns.

15. An ultrasonic motor as claimed in claim 14; further comprising second projections for adjusting a vibrational state of the vibrating member, each of the second projections being disposed between two of the first projections and having a length shorter than a length of the first projections so that the second projections do not transmit a vibrational movement of the vibrating member to the moving member.

16. An ultrasonic motor as claimed in claim 8; further comprising an output shaft connected to the moving member for transmitting a movement of the moving member to the exterior of the ultrasonic motor.

17. An electronic apparatus comprising:

a piezoelectric element having first and second surfaces;

a plurality of electrode patterns disposed on the first surface of the piezoelectric element;

first and second circuit means for short-circuiting every other one of the electrode patterns to form two electrode pattern groups;

a moving member;

a vibrating member for frictionally driving the moving member, the vibrating member being disposed on the second surface of and electrically connected to the piezoelectric element;

a pressure-regulating member for urging the moving member into pressure contact with the vibrating member;

an oscillation drive circuit having at least two power amplifiers each of which has an output terminal connected to one of the electrode pattern groups, and a preamplifier having an input terminal and an output terminal, the input terminal of the pre-amplifier being connected to one of the first and second surfaces of the piezoelectric element, and the output terminal of the pre-amplifier being connected to input terminals of the at least two power amplifiers; and display means connected to the moving member for displaying predetermined information on the basis of movement of the moving member.

18. An electronic apparatus as claimed in claim 17; wherein each of the at least two power amplifiers of the oscillation drive circuit drives one of the electrode pattern groups independently from each other one.

19. An electronic apparatus as claimed in claim 17; wherein one of the pre-amplifier and the at least two power amplifiers comprises an inverting amplifier.

20. An electronic apparatus as claimed in claim 17; further comprising forward/reverse signal generating means for producing a forward/reverse signal to set a rotational direction of the moving member, and a switching circuit for selecting at least one of the at least two power amplifiers of the oscillation drive circuit on the basis of the forward/reverse signal outputted from the forward/reverse signal generating means.

21. An electronic apparatus as claimed in claim 17; wherein the oscillation drive circuit further comprises a resonance circuit comprised of the vibrating member and a capacitor.

22. An electronic apparatus as claimed in claim 17; wherein the plurality of electrodes are disposed on the first surface of the piezoelectric element at nearly equal intervals in a multiple of four, wherein each pair of two neighboring electrode patterns have an alternately reversed direction of polarization.

23. An electronic apparatus as claimed in claim 22; further comprising first projections for transmitting vibrational movement of the vibrating member to the moving member, the first projections being disposed on a surface of the vibrating member near every other one of the boundaries of the electrode patterns.

24. An electronic apparatus as claimed in claim 23; further comprising second projections for adjusting a vibrational state of the vibrating member, each of the second projections being disposed between two of the first projections and having a length shorter than a length of the first projections so that the second projections do not transmit a vibrational movement of the vibrating member to the moving member.

25. An electronic apparatus as claimed in claim 17; further comprising an output shaft connected to the moving member for transmitting a movement of the moving member to the exterior of the ultrasonic motor.

* * * * *